Aug. 12, 1924.
W. T. PAYTON
1,504,780
CHECK OR THE LIKE
Filed April 12, 1923
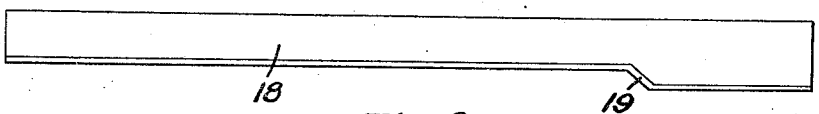
FIG.1.
FIG.2.
FIG.3.
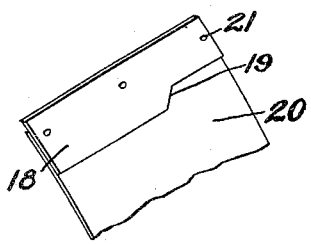
FIG.4.
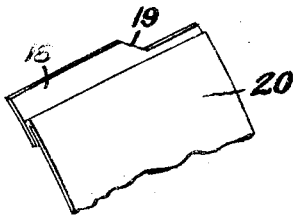
FIG.5.
Inventor
W.T.Payton
By
Attorney Patented Aug. 12, 1924.

1,504,780

UNITED STATES PATENT OFFICE.

WILLIAM TALBOT PAYTON, OF WESTMOUNT, QUEBEC, CANADA.

CHECK OR THE LIKE.

Application filed April 12, 1923. Serial No. 631,600.

*To all whom it may concern:*

Be it known that I, WILLIAM TALBOT PAYTON, a British subject, residing at No. 25 Burton Avenue, in the city of Westmount, in the Province of Quebec, in the Dominion of Canada, have invented certain new and useful Improvements in Checks or the like; and I do hereby declare that the following is a true, clear, and exact description of the same.

The present invention relates to improvements in checks or the like, and is hereafter fully described and illustrated in the accompanying drawings, in which:

Figure 1 is a plan view of a check and stub according to the invention.

Figure 2 is a plan view of the check detached from its stub and which has been drawn for a specific amount.

Figure 3 is a plan view of the cutting instrument.

Figure 4 is a perspective view of a portion of a cover of a check book, one edge of which is provided with a cutter.

Figure 5 is a perspective view of the cover of a check book, one side of which is provided with a cutter, illustrated in a different position.

Like numerals of reference indicate corresponding parts in each figure.

Referring to the drawings:

1 is a check blank preferably of the usual rectangular shape, having the stub portion 2, the said stub being suitably ruled (as disclosed in Figure 1 of the drawings) and adjacent said stub portion 2 on said check 1 is provided a plurality of spaces 3, 4, 5, 6, 7, 8 and 9, each of said spaces being formed by the vertical lines 10, and cross or horizontal lines 11 and 12, said horizontal lines 12, running right across the face of the check, adjacent its upper edge. Within said spaces 3, 7, 8 and 9, are preferably printed the numerals 1, 2, 3, 4, etc. up to any desired figure, said figures being equal in number to said spaces, while in the spaces 4 and 5 are preferably printed the words "Not over" or any similar phrase. In the space 6 provided intermediate of said spaces 5 and 7 are printed in letters the numbers "One, two, three," etc., said numbers corresponding to the numerals printed in the alining spaces 3, 7, 8, and 9.

In between the horizontal lines 12 are provided the spaces 13, 14 and 15 which are longitudinal and parallel to the upper edge of the check 1, said spaces 13 and 14 being cut preferably diagonally by the lines 16 to form the spaces 17, within which are located the numerals 10, 20, 30 up to 90, and from 100, 200 up to 900. Within the spaces 13 is preferably printed the words "Thousand dollars and." In the space 14, the words "Hundred dollars and" and in the space 15, the words "Dollars" are printed. In said space 15 sufficient room is provided for inserting the words "Do not pay over amount shown on safety margins" or any similar phrase.

In the body portion of the check 1 is printed as usual the name of the bank, the words "Pay to" and "Or order" and sufficient space is provided for inserting in writing the amount for which the check is drawn.

When making a check according to the invention, which check is drawn for $470.00 (as disclosed in Figure 2 of the drawings,) the cutting instrument 18 is placed across the check, its cutting edge being parallel to one of the vertical lines 10. In this case the cutter would be placed adjacent the numeral 4 and the check is then torn off. As this check is drawn for $470.00, the space 13 in which the words "Thousand dollars and" must be removed, leaving the spaces 14 and 15 only on the check blank 1. To do this the cutting instrument 18 which is provided with the diagonal cutting edge 19 is placed adjacent one of the spaces 17, in the present instance adjacent the space bearing the numeral "70," and the check is then torn longitudinally, thereby removing the space 13 integrally, indicating "Thousand dollars and," and leaving the space 14 with the numerals provided in the spaces 17 up to "70" inclusively. Therefore, the check in this condition reads not over 4 hundred dollars and 70 dollars.

It will readily be seen that when the check is cut according to the invention (see Figure 2) it is absolutely impossible for any one to raise this check, and if the amount written on the face of the check differs from the amount specified in the margin of the check, it should be considered as void. The check disclosed in the accompanying drawing can be drawn up to an amount of $95,900, but it may be made to reach a much higher amount without departing from the spirit of the invention.

In Figures 4 and 5 of the drawings is disclosed a modified form of cutter 18, said cutter being preferably shorter in length than the one shown in Figure 3 of the drawings, and is adapted to be suitably secured to one end of the check book cover 20. The said cutter being preferably secured by means of the rivets 21 and made to fold on the edge of said cover (as disclosed in Figure 5 of the drawings), in order to offer the side of the cutter having the diagonal edge 19.

What I claim as my invention is:

A check or the like comprising a blank ruled crosswise and lengthwise at one end to form a plurality of spaces, a plurality of these spaces bearing a numeral, the remaining spaces bearing the denominations disclosed in said plurality of spaces, the lengthwise lines adjacent the upper edge extending longitudinally and parallelly across said blank, said longitudinal and parallel lines adjacent the upper edge of said blank being divided by a plurality of oblique lines adapted to form a plurality of rhomboid shaped spaces extending through a portion of said lengthwise lines and each of said rhomboid spaces bearing a numeral; and a plurality of longitudinal spaces provided intermediate of said lengthwise lines and bounded at one end by said rhomboid shaped spaces and at their other end by said cross-wire lines, said longitudinal spaces bearing different denominations, substantially as described.

Signed at Montreal, Quebec, Canada, this 29th day of March, 1923.

WILLIAM TALBOT PAYTON

Witnesses:
  C. PATENAUDE,
  I. B. SMITH.